(12) United States Patent
Bruck et al.

(10) Patent No.: US 9,993,898 B2
(45) Date of Patent: Jun. 12, 2018

(54) METHOD AND APPARATUS FOR PREPLACEMENT OF METAL FILLER POWDER AND FLUX POWDER FOR LASER DEPOSITION

(71) Applicant: Siemens Energy, Inc., Orlando, FL (US)

(72) Inventors: Gerald J. Bruck, Oviedo, FL (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 569 days.

(21) Appl. No.: 14/461,463

(22) Filed: Aug. 18, 2014

(65) Prior Publication Data

US 2015/0224599 A1    Aug. 13, 2015

Related U.S. Application Data

(63) Continuation-in-part of application No. 14/282,410, filed on May 20, 2014, and a continuation-in-part of application No. 14/175,525, filed on Feb. 7, 2014.

(51) Int. Cl.
| | |
|---|---|
| *B23K 31/02* | (2006.01) |
| *B23K 35/02* | (2006.01) |
| *F01D 5/00* | (2006.01) |
| *B23K 26/342* | (2014.01) |
| *B23P 6/00* | (2006.01) |
| *B23K 101/00* | (2006.01) |

(52) U.S. Cl.
CPC ........ *B23K 35/0244* (2013.01); *B23K 26/342* (2015.10); *B23K 31/02* (2013.01); *B23K 35/0222* (2013.01); *B23K 35/0255* (2013.01); *B23K 35/0266* (2013.01); *F01D 5/005* (2013.01); *B23K 2201/001* (2013.01); *B23P 6/007* (2013.01); *F05D 2230/30* (2013.01)

(58) Field of Classification Search
CPC .. B23K 26/342; B23K 31/02; B23K 35/0222; B23K 35/0266; B23K 35/0255
See application file for complete search history.

(56) References Cited

U.S. PATENT DOCUMENTS

| | | |
|---|---|---|
| 1,828,554 A | 10/1931 | Bunker |
| 2,415,824 A | 2/1947 | Katz et al. |
| 3,042,790 A | 7/1962 | Johnson |
| 3,118,053 A * | 1/1964 | Arikawa ............ B23K 35/0272 219/145.22 |
| 4,071,394 A | 1/1978 | Ball |

(Continued)

*Primary Examiner* — Brian Jennison

(57) ABSTRACT

Forming respective packets (20, 21, 46, 50, 52, 70, 82, 84) of filler metal powder (24) and flux powder (26) for adjacent placement on a working surface (30) for laser deposition of the metal. Each packet may be formed of a sacrificial sleeve (22) or adjacently seamed sheets (72A-D), which may include flux fibers such as alumina, zirconia, basalt, or silica. A packet (56) of flux may be disposed centrally inside a packet (56) of metal or vice versa. A connected stack (70, 82, 84) of three packets (74A-C, 86A-C) may be formed by seaming (76A-B) four stacked sheets (72A-D) around common edges and filling the three resulting spaces between the sheets with a respective vertical sequence of metal/flux/metal or flux/metal/flux powders. Quilting and intermediate stitching may provide for precise control of material distribution and facilitate feeding of material.

14 Claims, 5 Drawing Sheets

(56) References Cited

U.S. PATENT DOCUMENTS

| | | |
|---|---|---|
| 4,124,731 A | 11/1978 | Dilo |
| 4,372,191 A | 2/1983 | Iansucci et al. |
| 4,934,225 A | 6/1990 | Languillat et al. |
| 5,264,162 A | 11/1993 | Salem et al. |
| 5,427,865 A * | 6/1995 | Mullen, III ........ B23K 35/0244 228/56.3 |
| 6,077,376 A | 6/2000 | Katraro et al. |
| 2004/0056078 A1* | 3/2004 | Kee ........................ B23K 1/018 228/245 |
| 2011/0186617 A1 | 8/2011 | Hartnett et al. |
| 2013/0136868 A1* | 5/2013 | Bruck ...................... B05D 3/06 427/554 |
| 2014/0124925 A1* | 5/2014 | Sidhu .................. H01L 21/4853 257/738 |

* cited by examiner

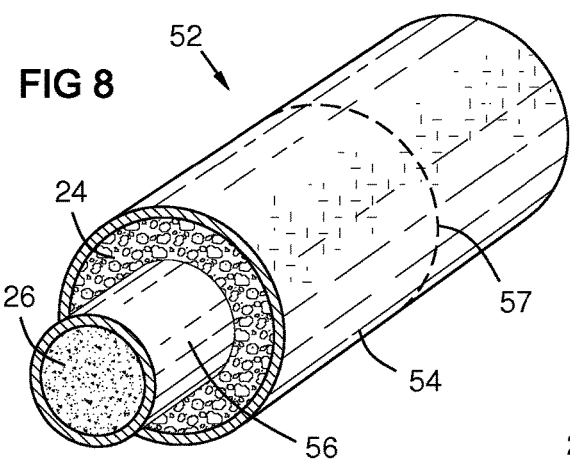
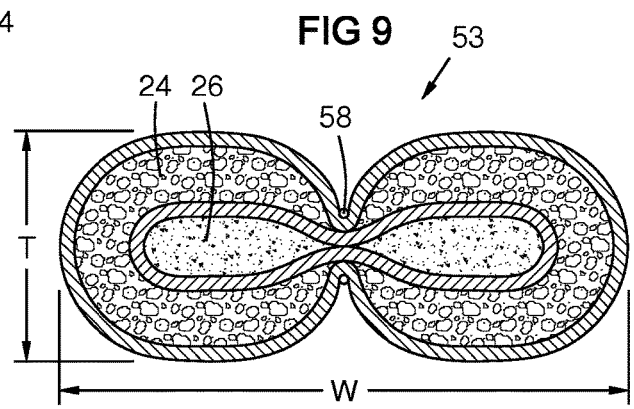
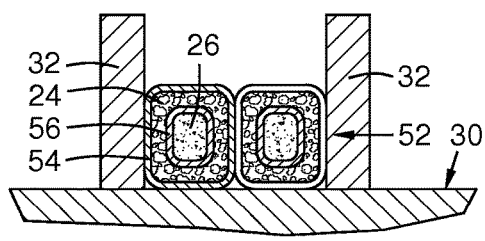
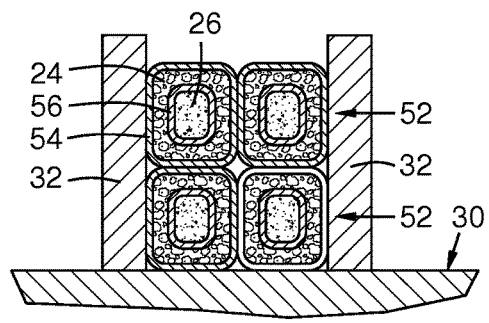

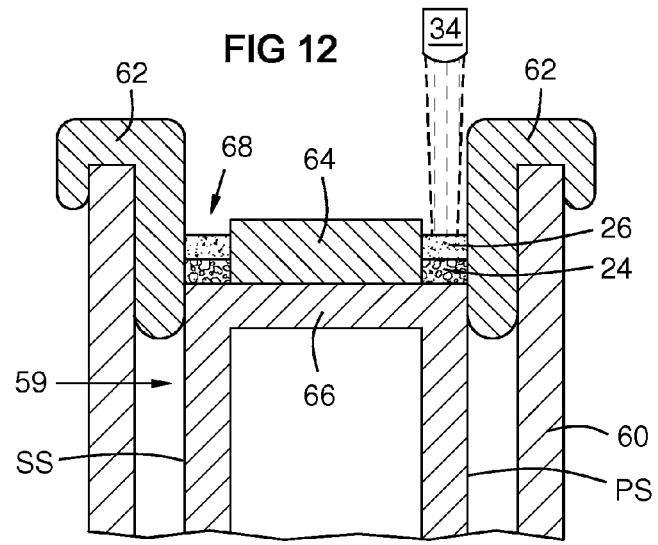
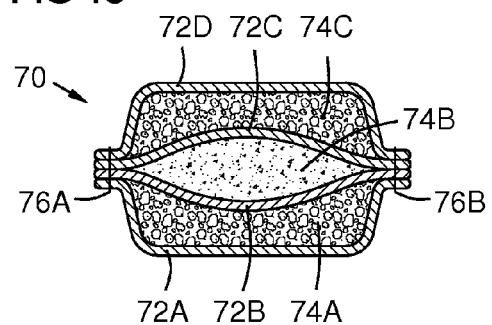
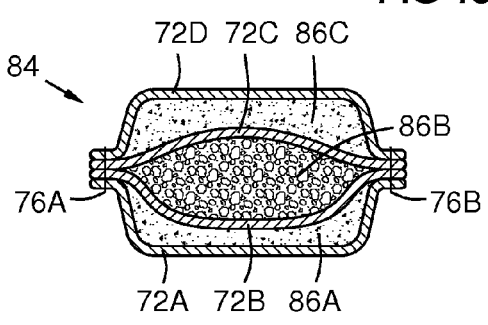
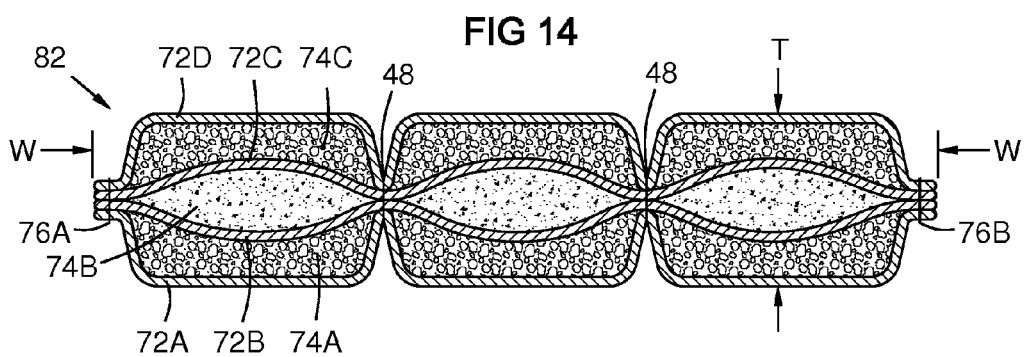

METHOD AND APPARATUS FOR PREPLACEMENT OF METAL FILLER POWDER AND FLUX POWDER FOR LASER DEPOSITION

This application is a continuation-in-part of co-pending U.S. patent application Ser. No. 14/282,410 filed 20 May 2014 and co-pending U.S. patent application Ser. No. 14/175,525 filed on 7 Feb. 2014, both of which are incorporated by reference herein.

FIELD OF THE INVENTION

The invention relates to additive fabrication and repair of metal components, and particularly to preplacement of metal filler powder and flux powder on a working surface for laser deposition of the metal.

BACKGROUND OF THE INVENTION

Laser melting of filler metal is used for additive manufacturing and repair of articles including gas turbine components. Flux can be introduced via a flux core in a wire of filler metal or a flux coating on a filler wire or as granulated flux material fed in conjunction with solid filler metal in wire or strip form. Alternately, the filler metal and flux can be provided in powder form. Powder is particularly advantageous because laser energy is more readily captured by powder than by solid filler metal. A disadvantage of wire feed is that the laser beam must continually focus on the wire while simultaneously feeding and moving the wire in precise alignment with the laser. Wire cannot be moved as quickly as a laser beam scanned by pivoting mirrors. Thus, wire limits the processing speed.

Filler powder delivery options include:

(1) Powder sprayed to the point of processing. This results in scattering and waste of powder. Even on flat horizontal surfaces, the net capture of sprayed powder is only about 65%. Powder spray nozzles cannot move as quickly as a laser beam, so nozzles limit the processing speed.

(2) Preplacement of powdered metal and powdered flux in separate layers. This controls the filler thickness distribution and the metal/flux ratio. However, it is labor intensive and time consuming (3) Preplacement of a mixture of powdered metal and powdered flux. This reduces labor by about half over placing metal and flux in separate layers. However, it is difficult to ensure uniform mixing due to differences in size and density of the respective powders. Use of composite metal/flux powder avoids such mixing and segregation issues, but composite preparation is expensive and time consuming (4) Capturing metal and flux powders in a sacrificial sleeve or packet that is placed in the path of processing is a good option because powder waste is minimized and precise distribution of powder is possible. This method is relatively quick and requires little labor. However, mixed metal and flux powders in a sleeve can still segregate, resulting in inconsistent metal/flux ratios across the powder volume and the working surface area.

BRIEF DESCRIPTION OF THE DRAWINGS

The invention is explained in the following description in view of the drawings that show:

FIG. 8 is a perspective/sectional view of a combined two-packet embodiment with a sleeve containing flux powder centrally located within a sleeve containing metal powder.

FIG. 9 is a transverse sectional view of a packet embodiment formed as in FIG. 8, then quilted with a longitudinal stitch to control the powder distribution.

FIG. 10 shows a single layer of the two-packet embodiment of FIG. 8 placed on a working surface between laser blocking shoes.

FIG. 11 shows a double layer of the two-packet embodiment of FIG. 8 placed on a working surface between laser blocking shoes.

FIG. 12 is a sectional view of apparatus and process for building squealer ridges on a gas turbine blade tip using aspects of the invention.

FIG. 13 shows a connected vertical stack of three packets of metal/flux/metal formed in respective spaces between four stacked sheets seamed together around the edges.

FIG. 14 shows a horizontal repetition of the 3 stacked packets of FIG. 13 using quilting intermediate the seamed edges.

FIG. 15 shows a connected vertical stack of three packets of flux/metal/flux formed in respective spaces between four stacked sheets seamed together around the edges.

DETAILED DESCRIPTION OF THE INVENTION

Figure 1:
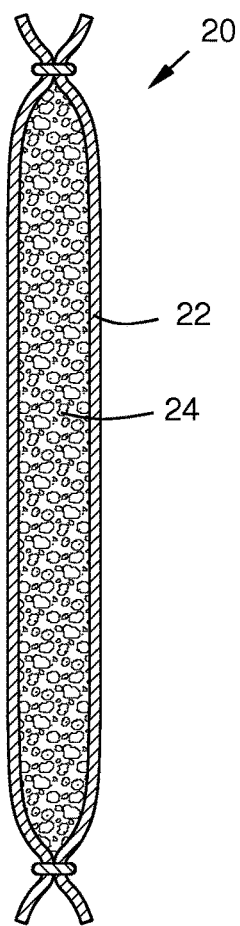
FIG. 1 is a sectional view of a filler packet formed by a sacrificial sleeve containing metal powder.

FIG. 1 shows a filler packet 20 for laser deposition formed of a sleeve 22 containing metal powder 24. The sleeve may be a sacrificial material such as cotton or synthetic fabric or a polymer film, and/or it may include flux constituents such as at least one of zirconia, alumina, basalt, and silica fabric.

Figure 2:
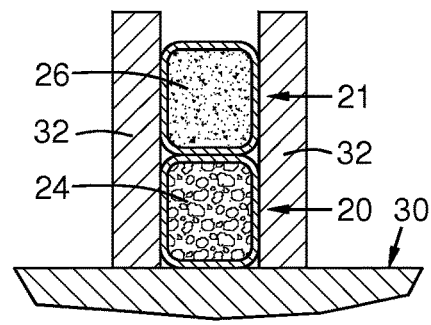
FIG. 2 is a sectional view of respective packets of metal powder and flux powder placed on a working surface and framed by laser blocking shoes for an accurate edge.

FIG. 2. shows an upper filler packet 21 of flux powder 26 on a lower filler packet 20 of metal powder 24 placed on a working surface 30, which may be a surface of a substrate for repair or fabrication or a worktable or bed of support material such as graphite or zirconia for a first layer of new fabrication. The filler packets may be abutted or framed by one or more adjacent rigid forms or shoes 32 of a laser blocking material such as graphite or zirconia that can tolerate the heat of processing. Such shoes contain and accurately define sides of the melt pool and thus define sides of the final deposition layer. Such shoes also manage heat dissipation by way of their conductive properties (e.g. graphite) or insulative properties (e.g. zirconia).

Figure 3:
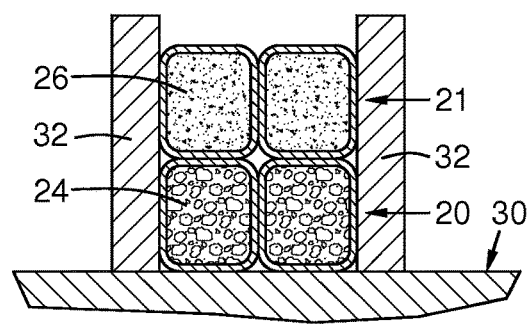
FIG. 3 shows horizontal repetition of the packets of FIG. 2 to cover a wider area.

FIG. 3 shows an area of a working surface 30 covered by horizontal repetitions of the stacked packets 20, 21 of FIG.

2. Alternately flat quilted packets may be used to cover relatively wide areas as later shown.

Figure 4:
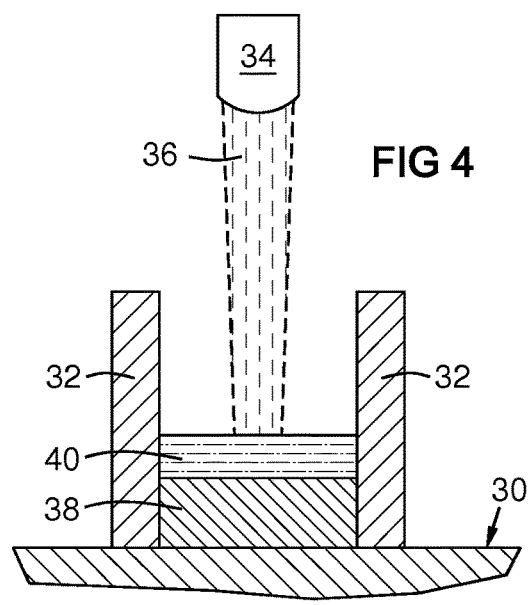
FIG. 4 illustrates a process of directing a laser beam onto the packets of FIG. 3 forming a metal melt covered by a slag blanket.

FIG. 4 shows a laser emitter 34 emitting a laser beam 36 to melt the metal and flux powders, forming a melt pool 38 with a blanket of slag 40. The slag blanket thermally insulates the melt pool, which maximizes laser energy transfer to the metal powder, makes heating more uniform, and makes solidification more gradual and consistent. Other forms of energy beams may be used such as electron beams and plasma beams.

Figure 5:
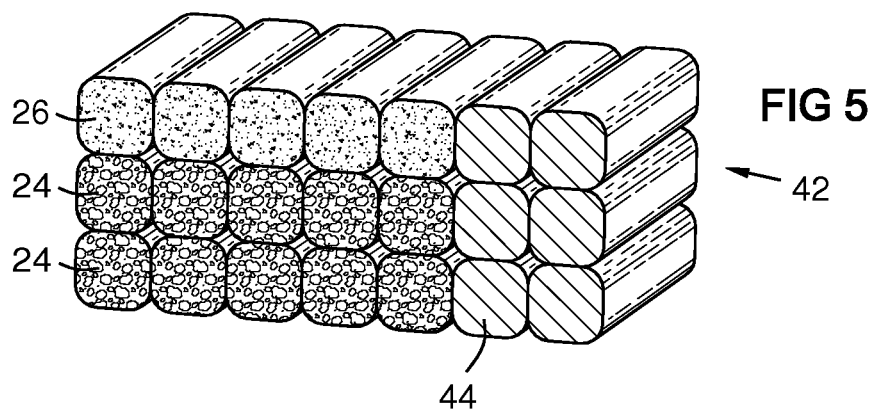
FIG. 5 shows an array of adjacent packets containing metal powder, flux powder, and a laser blocking material in respectively different portions of the array.

FIG. 5 shows an array 42 of adjacent filler packets including bottom layers of packets with metal powder 24, a top layer of packets with flux powder 26, and a side array of packets with a laser blocking material powder 44.

Figure 6:
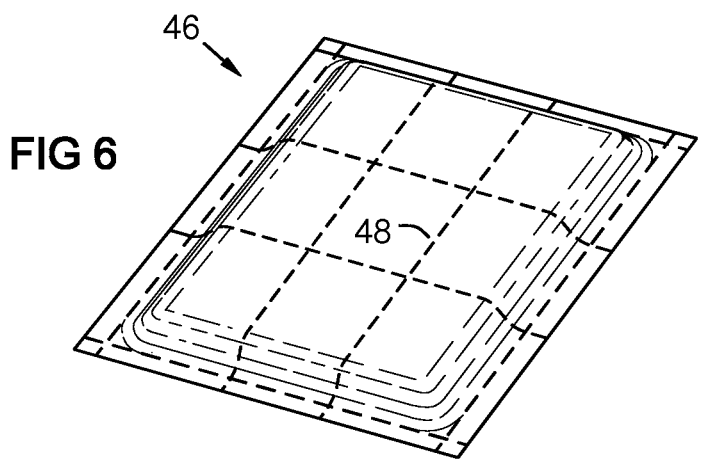
FIG. 6 is a perspective view of a filler packet maintained in a flat shape by quilting.
Figure 7:
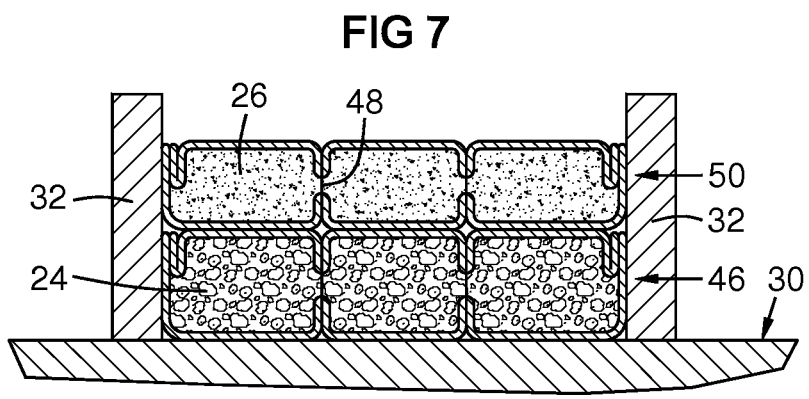
FIG. 7 is a sectional view of two stacked quilted packets containing metal and flux powders respectively.

FIG. 6 shows a planar filler packet 46 with quilting 48 to maintain the planar shape and to maintain uniform (or alternately non-uniform but deliberate and controlled) distribution of powder over the plane of the filler packet. Such planar packet would be of particular use for applications to wide surfaces of either flat or curved configuration. FIG. 7 shows a first planar (in this case flat) filler packet 46 containing metal powder 24, and a second flat filler packet 50 containing flux powder 26, placed on a working surface 30 and framed by laser blocking shoes 32. Quilting with at least one line of intermediate stitching as shown provides a relatively thin and wide packet. For example the packet width may be at least twice the thickness to provide a given thickness of filler material over a wider area.

FIG. 8 shows a combined two-packet embodiment 52 with an outer sleeve 54 containing metal powder 24 and a concentric inner sleeve 56 containing flux powder 26 and surrounded by the metal powder. The sleeves may include fabric or other flexible sacrificial tubing as previously described. Exemplary non-limiting diameters are 6 mm for the outer sleeve and 3 mm for the inner sleeve. The packets may be intermittently stitched 57 transversely along the length of this coaxial rope-like arrangement to control powder distribution. Arrangements as shown in FIG. 6 and FIG. 8 may be elongated as needed, and may be fed from rolls of blanket-like or rope-like packets respectively to the locations to be processed.

FIG. 9 is a sectional view of a packet embodiment 53 formed as in FIG. 8, and then quilted with at least one line of longitudinal stitching 58 to form and maintain a relatively thin and wide packet that provides a given thickness of filler material over a wider area. For example the packet width W may be at least twice the thickness T.

FIG. 10 shows combined filler packets 52 placed on a working surface and surrounded by laser blocking boots 32. FIG. 11 shows multiple layers of such filler packets placed on the working surface for thicker deposition in a single process. Alternately, a first deposition can be made with a single layer of packets. After solidification, the slag is removed, and the process is repeated with further layer(s) of packets as needed.

FIG. 12 shows a gas turbine blade tip 59 with a pressure side PS and a suction side SS in a chamber or fixture 60 that holds laser blocking shoes 62 against sides of the blade tip. A further laser blocking shoe 64 is positioned on the blade tip cap 66. This provides channels 68 for building a squealer ridge on the blade tip. Packets of metal powder 24 and flux powder 26 as described herein are placed in the channels for laser deposition. After a first deposition layer is formed and solidified, the slag is removed. The first deposition layer then provides a new working surface on which additional layer(s) (if required) may be deposited to build-up the squealer ridge to a desired height.

FIG. 13 shows a connected stack 70 of three packets 74A-C formed by seaming 76A-B four stacked sacrificial sheets 72A-D around common edges thereof, and filling the three resulting spaces between the sheets with a sequence of metal/flux/metal (shown) or flux/metal/flux (FIG. 15). The seams 76A-B may be stitches, adhesive, or melts. In this embodiment, the flux packet 74B cannot rise or sink in the surrounding metal powder, since the metal powder cannot flow between the upper and lower packets 74A, 74C.

FIG. 14 shows a connected stack 82 of four sacrificial sheets 72A-D that are seamed 76A-B around common edges thereof, and are quilted 48, forming a planar (in this case flat) combination of vertically adjacent packets 74A-C as in FIG. 13 that are repeated horizontally, providing a distribution of filler material over an area of the working surface. Quilting provides a relatively thin and wide packet. For example the packet width W may be at least twice the thickness T to provide a desired thickness of filler material over a wider area.

FIG. 15 shows a connected stack 84 of three adjacent packets 86A-C formed by seaming 76A-B four stacked sacrificial sheets 72A-D around common edges thereof, and filling the three resulting spaces between the sheets with a sequence of flux/metal/flux. The ratios of the packet sizes in embodiments 70, 82, and 84 can be adjusted as desired. FIG. 15 illustrates sizing the bottom, middle, and top packets respectively smallest, largest, and intermediate. Thus the central metal packet is largest, the lower flux packet is thinnest, but is sufficient to facilitate fusion and to provide flux rising through the melt to scavenge contaminants, and the top flux packet is intermediate in size to form a slag blanket on the melt pool.

Figure 16:
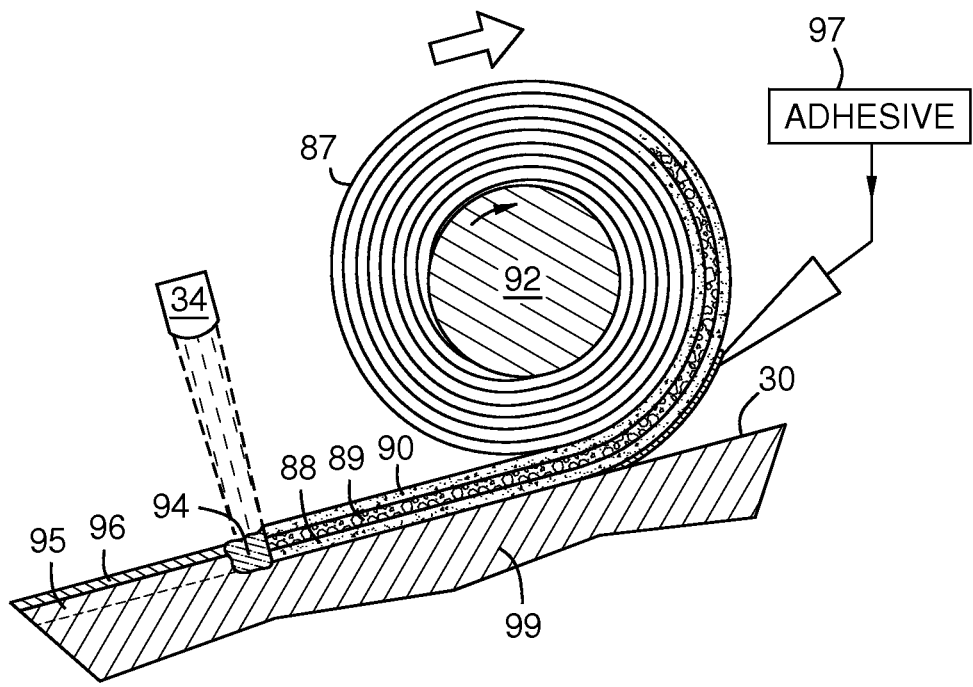
FIG. 16 illustrates a method of providing an elongated form of stacked filler packets on a roll, and feeding the stacked filler packets from the roll ahead of laser processing.

FIG. 16 illustrates a method of providing an elongated form 87 of stacked filler packets 88, 89, 90 on a roll 92. The elongated form may comprise one or more sequences of filler packets attached end-to-end, or it may comprise stacked filler packets formed as in one of FIG. 8, 9, or 13-15. The roll 92 may feed the elongated form of stacked filler packets onto a substrate 99 ahead of a laser beam 34 that melts the metal and flux filler powders on the substrate, forming a metal layer 95 fused to the substrate and a slag blanket 96 on the metal layer. Optionally, an adhesive 97 may be applied to the elongated form of filler packets as it unrolls before it contacts the surface 30 of the substrate, or the adhesive may be applied directly to the working surface 30 ahead of the roll 92.

Whether stacked or assembled coaxially, the dual packet system and method allows for simple preplacement of powders, and avoids segregation issues. Packets may be automatically fed ahead of laser processing by feeders pulling elongated packet(s) or a series of connected packets from spools. The packets may be used on non-horizontal surfaces by gluing the packets in position with adhesives or cements designed for use with silica or other ceramic-like materials.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:
1. A method comprising:
    forming a stack of three packets from a stacked sequence of first packet, second packet, and third packet and four stacked sacrificial sheets seamed together along com- mon edges thereof, wherein the first packet is formed between the first and the second sheets, the second packet is formed between the second and the third sheets, and the third packet is formed between the third and the fourth sheets;

filling the first packet, the second packet and the third packet with a sequence of metal powder, flux powder and additional metal powder;

placing the first packet on a working surface; and melting the stack of the three packets to deposit metal on the surface under a layer of slag.

2. The method of claim 1, further comprising:

framing the stack of the three packets with shoes of a laser blocking material; and directing a laser beam onto the stack of the three packets to form a melt pool between the shoes.

3. The method of claim 1, further comprising stitching at least another stack of three packets with the stack of the three packet to form a relative thin and wide packet.

4. A method comprising:

forming a stack of three packets from a stacked sequence of first packet, second packet, and third packet and four stacked sacrificial sheets seamed together along common edges thereof, wherein the first packet is formed between the first and the second sheets, the second packet is formed between the second and the third sheets, and the third packet is formed between the third and the fourth sheets;

filling the first packet, the second packet and the third packet with a sequence of flux powder, metal powder and additional flux powder;

placing the first packet on a substrate;

directing a laser beam over the stack of the three packets, melting the flux powder and the metal powder, forming a slag blanket on a metal melt, and fusing the metal to the substrate.

5. The method of claim 4, further comprising placing a first laser blocking shoe on the substrate along a first side of the stack of the three packets before directing the laser beam.

6. The method of claim 5, further comprising placing a second laser blocking shoe on the substrate along a second side of the stack of the three packets before directing the laser beam, wherein the metal melt forms a melt pool bounded by the first and second laser blocking shoes.

7. The method of claim 4, further comprising stitching at least another stack of three packets with the stack of the three packet to form a relative thin and wide packet.

8. The method of claim 4, further comprising forming at least one of the three packets of a fabric comprising at least one of silica, zirconia, basalt, and alumina.

9. The apparatus of claim 4 further comprising providing an elongated form of the three packets on a roll, and feeding the elongated form from the roll onto the substrate ahead of the laser beam.

10. An apparatus comprising:

a stack of three packets from a stacked sequence of first packet, second packet, and third packet; and four stacked sacrificial sheets seamed together along common edges thereof, wherein the first packet is formed between the first and second sheets, the second packet is formed between the second and third sheets, and the third packet is formed between the third and fourth sheets, wherein the first packet contains a first power, the second packet contains a second powder, and the third packet contains a third powder;

wherein the first, the second and the third powders comprise one of a metal powder or a flux powder.

11. The apparatus of claim 10, further comprising at least another stack of three packets stitched with the stack of the three packet to form a relative thin and wide packet.

12. The apparatus of claim 10, wherein the first packet contains the metal powder, the second packet contains the flux powder and the third packet contains additional metal powder.

13. The apparatus of claim 10, wherein the first packet contains the flux powder, the second packet contains the metal powder and the third packet contains additional flux powder.

14. The apparatus of claim 10, wherein sizes of the first, the second and the third packets are adjustable.

* * * * *